July 4, 1961     K. G. KREUTER     2,990,780
CONTROL FOR FLUID SYSTEM

Filed Feb. 16, 1959     2 Sheets-Sheet 1

INVENTOR.
KENNETH G. KREUTER
BY *M. A. Hobbs*
ATTORNEY

July 4, 1961
K. G. KREUTER
2,990,780
CONTROL FOR FLUID SYSTEM
Filed Feb. 16, 1959
2 Sheets-Sheet 2
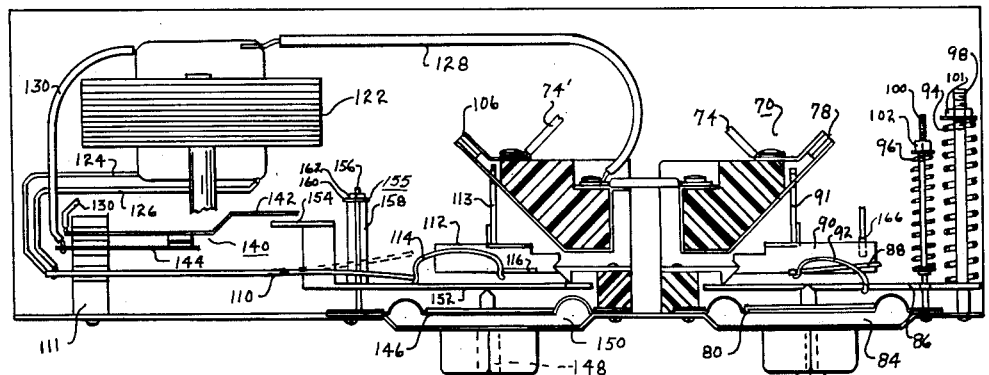
FIG. 3
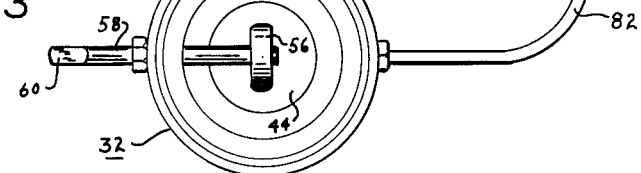
FIG. 5
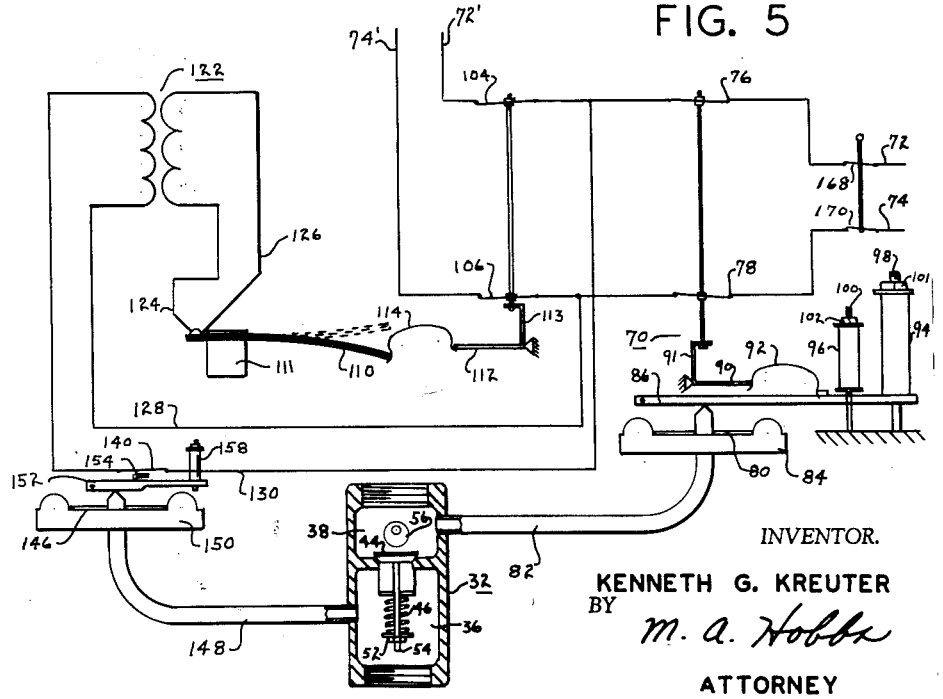
INVENTOR.
KENNETH G. KREUTER
BY
M. A. Hobbs
ATTORNEY

United States Patent Office 2,990,780
Patented July 4, 1961

2,990,780
CONTROL FOR FLUID SYSTEM
Kenneth G. Kreuter, Goshen, Ind., assignor, by mesne assignments, to Robertshaw-Fulton Controls Company, Richmond, Va., a corporation of Delaware
Filed Feb. 16, 1959, Ser. No. 793,527
6 Claims. (Cl. 103—25)

The present invention relates to a control mechanism and more particularly to a pressure responsive electrical control mechanism for fluid systems, such as, for example, automatically controlled, intermittently operated water well systems.

In conventional water well systems of the submersible pump type, the pump and motor for driving the pump are placed in the well below or near the normal water level in the well and are controlled by an electrical system which responds to the pressure in a storage tank or the like usually at or near ground level. The electrical system for controlling the motor includes a pressure responsive device which senses the pressure in the storage tank and starts or stops the pump motor in accordance with the quantity of water in the tank as determined by the pressure on the pressure responsive device. In the conventional system of this type once the motor is started, it will continue to operate until the pressure in the storage tank has been returned to the degree indicating the desired high level amount of water in the tank. The motor then shuts off and remains off until the water pressure in the tank is again lowered to a predetermined point indicating the need for a further supply of water from the well. In this type of well systems as in most other types the water level sometimes is lowered to a point below the pump intake and as a result the pump motor continues to operate indefinitely or until it is shut off by the use of a manual switch after the low water condition has come to the attention of the user. This continued useless operation of the pump causes wear and tear on the pump and motor and possibly serious damage or complete destruction of these units, unnecessarily reducing their life and needlessly increasing the service and maintenance costs throughout the life of the system. It is, therefore, one of the principal objects of the present invention to provide a control mechanism for such systems, which not only senses the storage tank water requirements but also effectively senses the failure of the pump to deliver water in response of the low water condition in the tank and stops the pump motor until the pump failure has been checked and corrected.

Another object of the invention is to provide an electrical mechanism for a pumping system of the foregoing type, which is compact and easy to regulate and adjust and which includes all the essential control elements in a single unit.

Still another object of the invention is to provide a system for performing the foregoing operations which can be manufactured and sold as a single unit ready for installation in the system or in which the individual operating components are constructed as separate units and then assembled and/or connected to form the complete system when the system is installed.

A further object is to provide a control mechanism of the foregoing type which can be incorporated in a number of different types of fluid systems and which can readily be rearranged to meet installation and service requirements in a variety of fluid systems.

Additional objects and advantages of the present invention will become apparent from the following description and accompanying drawings, wherein:

FIGURE 3 is a plan and partial cross sectional view of my control mechanism showing the manner in which the control is connected into the water system;

FIGURE 5 is a schematic diagram of the electrical system showing the manner in which it is operatively connected to the water supply system, the parts of the electrical system being rearranged and modified to better show the operation of said system.

Figure 1:
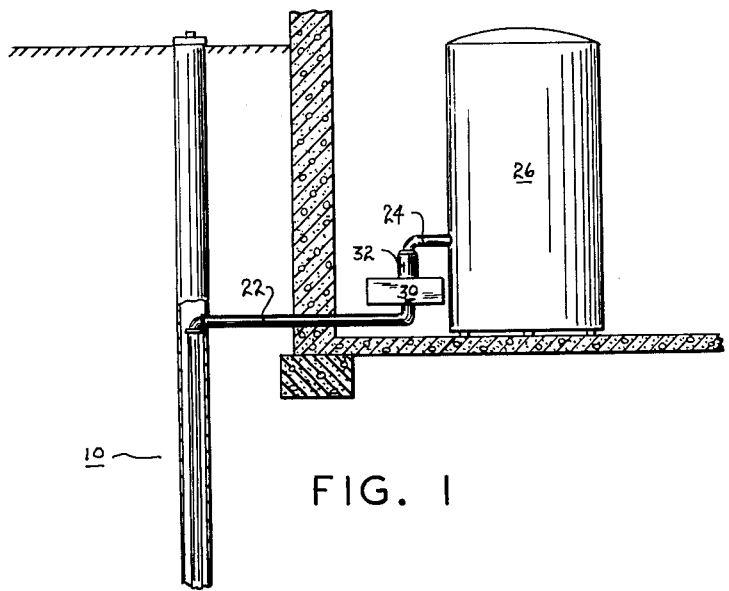
FIGURE 1 is a partial cross sectional and elevational view of a well and pumping system, regulated by the present electrical control system shown only in outline therein.
Figure 2:
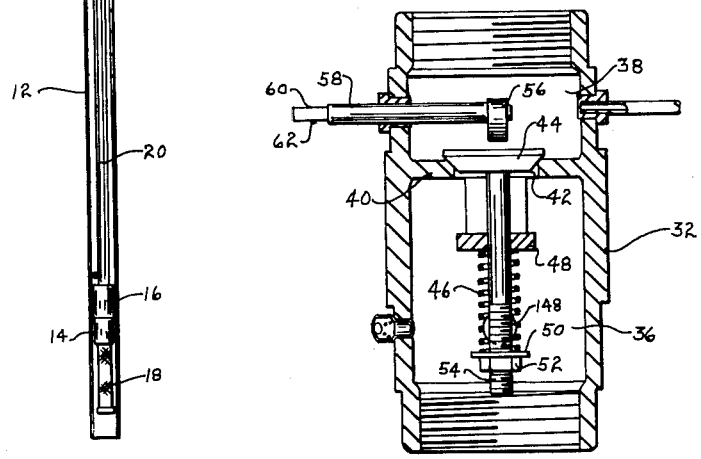
FIGURE 2 is a vertical cross section of a valve which is placed in the water line between the pump and storage tank.

Referring more specifically to the drawings and to FIGURE 1 in particular, numeral 10 designates a water well having a casing 12 in which is disposed a submersible pump 14 and motor 16, the pump having an inlet screen 18 therebelow normally fully submerged in the water in the well. The pump is connected by conduits 20, 22 and 24 with a storage tank 26 installed in the basement or utility room of a home though it may be installed in any other location convenient to the user. My control mechanism 30 is shown installed in the water line between the pump and tank close to the tank where it can be easily reached for servicing and adjustments. It may, however, be located in any other convenient place in said line. My control is connected to a source of electrical current and to motor 16 by standard wiring (not shown).

When the motor is operating and the pump is delivering water from the well to the tank, the water passes upwardly through conduits 20, and 22 through a valve generally designated by numeral 32 located in the installation between conduits 22 and 24 near the tank. The valve consists of chambers 36 and 38 separated by a wall 40 having a central opening 42 therethrough. A valve element 44 seats on the outlet side of the opening and is urged to its seat by a spring 46 reacting between a support member 48 and a washer 50 held in place by a nut 52 on valve stem 54. The water pressure from the pump required to open valve element 44 can be adjusted by increasing or decreasing the compression on spring 46 by rotating nut 52. In order to restrict the extent to which the valve can be opened and thus control the pressure differential on opposite sides thereof, an adjustable stop means is provided on the posterior side of the valve element, consisting of a cam 56 mounted on the inner end of a rotatable shaft 58 which extends in sealed relation through the side wall of the valve and is provided with opposed flattened surfaces 60 and 62 for receiving a wrench for making an adjustment of the cam. As shaft 58 is rotated cam 56 either moves toward or away from the upper side of the valve element and thereby varies the extent to which the valve can open. As the water is forced by the pump through the valve, valve element 44 is held open by the pressure of the water permitting the water to pass through the valve to the storage tank. When the motor stops, the pressure on the lower side of the valve 44 tending to open it is immediately relieved and the pressure of the water above the valve and the force of spring 46 closes said valve.

The pressure of the water in chamber 38 is substantially the same as that in the storage tank and, in the control shown in the drawing, this pressure is utilized to operate the main electrical switch mechanism 70 for the pump motor. This switch mechanism controls both lines 72 and 74 to the motor and includes switches 76 and 78 controlled by a diaphragm 80 which is responsive to the pressure in chamber 38 of the valve as transmitted through conduit 82 to chamber 84 behind said diaphragm.

Only switch 78 is shown in FIGURE 3. The diaphragm operates a pivoted lever 86 which in turn operates a linkage consisting of levers 88, 90 and 91 and a toggle spring 92 to open switches 76 and 78 simultaneously when the pressure in chamber 84 reaches a predetermined value. The degree of pressure in chamber 84 required to operate the switches is determined by springs 94 and 96 mounted on stems 98 and 100, respectively. Spring 94 maintains a substantially constant force on the free end of lever 86 and this force can be adjusted by nut 101 to select the pressure in chamber 84 at which the switch will be opened. Spring 96 is picked up by lever 86 shortly before it has moved sufficiently to operate the switches and applies an additional force which must be overcome by the pressure in chamber 84 before the switches are opened. Spring 96 provides a spread between the high and low pressure levels at which the switches are closed and opened, and this spread can be varied within limits by varying the compression on the spring by screwing nut 102 upwardly or downwardly on stem 100.

Figure 4:
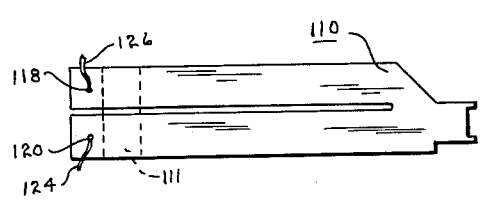
FIGURE 4 is a plan view of a part of a time delay power shut off mechanism used in the electrical system.

The pump water pressure in chamber 36 is utilized to operate emergency or safety control switches 104 and 106 which are in series with switches 76 and 78, respectively, leads 72' and 74' connecting said switches with the pump motor. These two switches are normally closed and are opened by a bi-metallic element 110 which, in the position shown in FIGURE 3, permits switches 104 and 106 to remain closed and, in the position shown in broken lines, opens said switches. This element is supported at one end by an insulating block 111 and is operatively connected at the other end to the switches by pivoted lever 112 and lever 113 and toggle spring 114 bearing against the end of said element and against member 116 on lever 112. The actual shape of element 110 is shown in FIGURE 4 and, in the embodiment shown, forms a heating element when connected into a circuit at points 118 and 120. Since a low voltage circuit is required for heating element 110, a step-down transformer 122 is included in the unit and is connected to points 118 and 120 by leads 124 and 126 and is connected into the main motor circuit by leads 128 and 130.

The circuit to the transformer and element 110 is controlled by a switch 140 in lead 130, including contact elements 142 and 144 and said switch normally remaining closed unless opened by a switch actuating mechanism including a diaphragm 146 responsive to pump pressure transmitted from chamber 36 through conduit 148 to chamber 150 behind the diaphragm. When the pressure in chamber 150 reaches a predetermined value it operates pivoted lever 152 and through insulated extension 154 thereon moves contact element 142 opening switch 140, thus interrupting the current to the transformer and element 110. The amount of pressure in chamber 150 required to open switch 140 is determined by a spring means 155 consisting of a stem 156, a spring 158 mounted on the stem and bearing at one end on the free end of lever 152 and against a washer and adjustable nut 160 and 162, respectively.

In the operation of the present control mechanism in the water supply system described herein, starting with the storage tank 26 filled to normal full capacity, switches 76 and 78 are held in open position by tank pressure as transmitted from chamber 38 through conduit 82 to chamber 84, the pressure on diaphragm 80 being sufficient to overcome the force of springs 94 and 96 and move lever 86 in the switch opening direction. In this condition the pump is inoperable and the current to the transformer and element 110 is off so that said element is cold and in the position shown in full lines, thus permitting switches 104 and 106 to remain in closed position. When the pressure in the storage tank decreases to a predetermined value as controlled by springs 94 and 96, said springs overcome the force of tank pressure and move lever 86 in the direction to permit switches 76 and 78 to close and complete the circuit to the pump motor.

Simultaneously the circuits through the transformer and to bi-metallic element 110 are completed causing said element to become hot. The element begins to move in the direction from the position shown in solid lines to that shown in broken lines where it will operate toggle 112 to open switch 106. If, however, in the meantime the pump is operating properly and delivering water through conduits 20 and 22 to chamber 36, diaphragm 146 will operate lever 152 and open switch 140, thus interrupting the current to element 110 and permitting it to cool and return to the position shown in full lines without having opened switches 104 and 106. The pump continues to operate normally until sufficient pressure is created in the storage tank to operate diaphgram 80 and open switches 76 and 78, thereby stopping the pump.

In the event the pump does not deliver water to the system after it has been started, in the manner described above, heating of element 110 will not be interrupted by diaphragm 146 acting through lever 152, and switch 140, and element 110 will reach the position shown in broken lines and actuate levers 112 and 113 to open switches 104 and 106, thereby stopping the pump. This condition would normally exist when the water level is below the inlet to the pump or when the pump has become worn and does not creat sufficient pressure to lift the water to valve 32. The current to element 110 remains on indefinitely, holding switches 104 and 106 open until the low pressure in the storage tank signifies to the user that the pump is not operating and should be checked. The circuit to element 110 is interrupted by manually operating lever 166 to open switches 76 and 78, thus permitting the element to cool and return to the position shown in full lines. A manually operated over-control switch mechanism such as switches 168 and 170, may be included in the system to interrupt both the operation of the pump motor and the current to element 110.

The time delay between the starting of the pump motor and the actuation of switches 104 and 106 is to give the pump sufficient time to build up normal operating pressure below the check valve if the pump is operating properly. This delay would normally be about one minute which is sufficient time to permit the pump to be in full operation and, if it is operating properly, element 110 is rendered ineffective by pressure responsive means 146 and switches 104 and 106 remain closed. If, however, the pump fails to build up the pressure within that period of time, because for example of insufficient or lack of water in the well, element 110 opens the switches and shuts off the motor, thus avoiding damage to the pump and motor. If the supply of water in the well is low but adequate, the system can be adjusted to operate satisfactorily at a low delivery rate by restricting valve 44, with cam 56, thus permitting the pump to build up sufficient pressure below the valve to operate pressure responsive means 146 and open switch 140.

While the present control mechanism has been illustrated in connection with a water supply system, it may be used satisfactorily in other kinds of systems. Further, the switch mechanism 70 which is responsive to the pressure in the tank may be mounted on the tank or at some other convenient place and the mechanism containing switches 104 and 106 and element 110 may be mounted either adjacent to valve 32 or located at some other convenient place and connected to chamber 38 of the valve by a suitable conduit. Different types of time delay mechanisms can be substituted for heat responsive element 110, and a mechanism for sensing flow rather than pressure in pipes 20, 22 and 24 can be used in place of pressure responsive means 146. Various other changes and modifications may be made without departing from the scope of the present invention.

I claim:

1. A control system for a well installation comprising a pump, a motor for driving said pump, an electrical circuit for energizing said motor, a pipe connected to said pump for carrying the fluid output of said pump, a check valve in said pipe, a first switch in fluid connection with said pipe on the side of said check valve away from said pump and responsive to the pressure in said pipe for controlling said electrical circuit, a second switch connected in series with said first switch, and a pressure responsive device in fluid connection with said pipe on the side of said check valve adjacent said pump and responsive to the pressure in said pipe for controlling the operation of said second switch.

2. A control system for well installation comprising a pump; a motor for driving said pump; an electrical circuit for energizing said motor; a pipe connected to said pump for carrying the fluid output of said pump; a check valve in said pipe; a first switch in fluid connection with said pipe on the side of said check valve away from said pump and responsive to the pressure in said pipe for controlling said electrical circuit; switch means connected to said electrical circuit including a second switch connected in series with said first switch, and time delay means operative when energized to control said second switch; and a switch in fluid connection with said pipe on the side of said check valve adjacent said pump and responsive to the pressure in said pipe for controlling energization of said time delay means.

3. A control system for a well installation comprising a pump; a motor for driving said pump; an electrical circuit for energizing said motor; a pipe connected to said pump for carrying the fluid output of said pump; a check valve in said pipe having an opening to allow fluid to pass through said check valve, valve means obstructing said opening; a first switch in fluid connection with said sponse to a predetermined pressure differential on opposite sides thereof, and adjustable stop means to restrict the degree of movement of said valve means away from said opening; a first switch in fluid connection with said pipe on the side of said check valve away from said pump and responsive to the pressure of said pipe for controlling said electrical circuit; a second switch connected in series with said first switch; and a pressure responsive device in fluid connection with said pipe on the side of said check valve adjacent said pump and responsive to the pressure in said pipe for controlling the operation of said second switch.

4. A control system for a well installation comprising a pump; a motor for driving said pump; an electrical circuit for energizing said motor; a pipe connected to said pump for carrying the fluid output of said pump; a check valve in said pipe having an opening to allow fluid to pass through said check valve, valve means obstructing said opening and movable away from said opening in response to a predetermined pressure differential on the sides thereof, and adjustable stop means to restrict the degree of movement of said valve means away from said opening; a first switch in fluid connection with said pipe on the side of said check valve away from said pump and responsive to the pressure in said pipe for controlling said electrical circuit; a second switch connected in series with said first switch; time delay means operative when energized to control said second switch; and a switch in fluid connection with said pipe on the side of said check valve adjacent said pump and responsive to the pressure in said pipe for controlling energization of said time delay means.

5. A control system for a well installation comprising a pump; a motor for driving said pump; an electrical circuit for energizing said motor; a pipe connected to said pump for carrying the fluid output of said pump; a check valve in said pipe; a first switch in fluid connection with said pipe on the side of said check valve away from said pump and responsive to the pressure in said pipe for controlling said electrical circuit; a second switch connected in series with said first switch; temperature responsive means connected to said electrical circuit for controlling said second switch; and a switch in fluid connection with said pipe on the side of said check valve adjacent said pump and responsive to the pressure in said pipe for controlling said temperature responsive means.

6. A control system for a well installation comprising a pump; a motor for driving said pump; an electrical circuit for energizing said motor; a pipe connected to said pump for carrying the fluid output of said pump; a check valve in said pipe; a switch in fluid connection with said pipe on the side of said check valve away from said pump and responsive to the pressure in said pipe for controlling said electrical circuit; switch means connected to said electrical circuit including a normally closed switch connected in series with said first mentioned switch, a transformer having first and secondary windings, a switch in fluid connection with said pipe on the side of said check valve adjacent said pump and responsive to the pressure in said pump responsive to the pressure in said pipe for controlling the flow of current in at least one of said windings, and time delay means connected to said second winding of said transformer and operative when energized to open said normally closed switch.

References Cited in the file of this patent

UNITED STATES PATENTS

| | | |
|---|---|---|
| 2,522,596 | Bevins | Sept. 19, 1950 |
| 2,707,440 | Long et al. | May 3, 1955 |
| 2,718,565 | Ruffle | Sept. 20, 1955 |
| 2,741,988 | Merritt | Apr. 17, 1956 |